(12) United States Patent  (10) Patent No.: US 9,003,779 B2
Kanamori  (45) Date of Patent: Apr. 14, 2015

(54) WHEEL LOADER

(71) Applicant: Komatsu Ltd., Tokyo (JP)

(72) Inventor: Shirou Kanamori, Nonoichi (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 14/112,303

(22) PCT Filed: Mar. 26, 2013

(86) PCT No.: PCT/JP2013/058727
§ 371 (c)(1),
(2) Date: Oct. 17, 2013

(87) PCT Pub. No.: WO2014/155510
PCT Pub. Date: Oct. 2, 2014

(65) Prior Publication Data
US 2014/0290224 A1  Oct. 2, 2014

(51) Int. Cl.
F01N 13/14 (2010.01)
F01N 3/20 (2006.01)
F01N 3/28 (2006.01)

(52) U.S. Cl.
CPC  *F01N 3/208* (2013.01); *F01N 3/28* (2013.10); *F01N 2610/02* (2013.01); *F01N 2610/10* (2013.01); *F01N 2610/1406* (2013.01)

(58) Field of Classification Search
USPC .................. 60/286, 295, 297, 301, 320
See application file for complete search history.

(56) References Cited

U.S. PATENT DOCUMENTS

2010/0031644 A1  2/2010  Keane et al.
2010/0038162 A1  2/2010  Kamiya et al.
2010/0212297 A1*  8/2010  Kamiya et al. .................. 60/286
(Continued)

FOREIGN PATENT DOCUMENTS

EP  2 474 672 A1  7/2012
JP  2000-27627 A  1/2000
(Continued)

OTHER PUBLICATIONS

International Search Report for PCT/JP2013/058727, issued on May 21, 2013.
(Continued)

*Primary Examiner* — Thomas Denion
*Assistant Examiner* — Jorge Leon, Jr.
(74) *Attorney, Agent, or Firm* — Global IP Counselors, LLP

(57) ABSTRACT

A wheel loader includes an engine, a selective catalyst reduction device, and an injection device accommodated in an engine room defined by a vehicle body cover. The wheel loader further includes a partition plate, a reducing agent tank, a reducing agent pump, and a reducing agent pipe. The selective catalyst reduction device is for treating exhaust gas from the engine. The injection device is for injecting reducing agent into the exhaust gas fed from the engine toward the selective catalyst reduction device. The partition plate is disposed between the selective catalyst reduction device and the vehicle body cover. The reducing agent tank stores reducing agent. The reducing agent pump supplies the reducing agent from the reducing agent tank to the injection device. The reducing agent pipe connects the reducing agent pump and the injection device, and extends between the vehicle body cover and the partition plate inside the engine room.

7 Claims, 14 Drawing Sheets

(56) References Cited

U.S. PATENT DOCUMENTS

2010/0293928 A1* 11/2010 Kamiya et al. .................. 60/295
2012/0174566 A1* 7/2012 Yamashita et al. .............. 60/295

FOREIGN PATENT DOCUMENTS

| JP | 2003-20936 A | 1/2003 |
| JP | 2009-138627 A | 6/2009 |
| JP | 2010-281275 A | 12/2010 |
| JP | 2011-230638 A | 11/2011 |
| JP | 2012-237232 A | 6/2012 |
| JP | 2012-225304 A | 11/2012 |
| JP | 2013-2082 A | 1/2013 |

OTHER PUBLICATIONS

The extended European Search Report for the corresponding European application No. 13750832.1, issued on Feb. 3, 2015.

* cited by examiner

WHEEL LOADER

CROSS-REFERENCE TO RELATED APPLICATIONS

This application is a U.S. National stage application of International Application No. PCT/JP2013/058727, filed on Mar. 26, 2013.

FIELD OF THE INVENTION

The present invention relates to a wheel loader.

BACKGROUND INFORMATION

Generally a diesel engine is used as the engine in a wheel loader. The diesel engine produces nitrogen oxide since the inside of the combustion chamber has an excessive amount of nitrogen, and thus the exhaust gas includes nitrogen oxides. A hydraulic excavator, for example, described in Japanese Patent Laid-open No. 2012-237232 includes a selective catalyst reduction device, an injection device, a reducing agent tank, a reducing agent pump, and a reducing agent pipe in order to remove the nitrogen oxides in the exhaust gas. The reducing agent pump feeds a reducing agent such as a urea aqueous solution stored in the reducing agent tank to the injection device through the reducing agent pipe, and the injection device injects the reducing agent into the exhaust gas upstream from the selective catalyst reduction device. As a result, the nitrogen oxides in the exhaust gas exhausted from the engine are reduced to nitrogen.

SUMMARY

Since the injection device is generally disposed inside the engine room, the reducing agent pipe needs to pass through the engine room. However, the reducing agent flowing through the reducing agent pipe is heated by radiant heat from the selective catalyst reduction device housed inside the engine room. A urea aqueous solution generally used as the reducing agent changes to ammonia when heated. Since ammonia has very strong alkalinity, there is a problem that the durability of the reducing agent pipe, the injection device, the reducing agent pump, and the reducing agent tank and the like is reduced.

An object of the present invention is to prevent the reducing agent pipe from being heated.

(1) A wheel loader according to an aspect of the present invention comprises an engine, a selective catalyst reduction device, an injection device, an engine room, a vehicle body cover, a partition plate, a reducing agent tank, a reducing agent pump, and a reducing agent pipe. The selective catalyst reduction device treats exhaust gas from the engine. The injection device injects the reducing agent into the exhaust gas fed from the engine toward the selective catalyst reduction device. The engine room accommodates the engine, the selective catalyst reduction device, and the injection device. The vehicle body cover defines the engine room. The partition plate has a first partition part that is disposed between the selective catalyst reduction device and the vehicle body cover. The reducing agent tank is disposed outside of the engine room and stores reducing agent. The reducing agent pump supplies the reducing agent from the reducing agent tank to the injection device. The reducing agent pipe connects the reducing agent pump and the injection device and extends between the vehicle body cover and the partition plate inside the engine room.

According to this configuration, the first partition part of the partition plate is disposed between the vehicle body cover and the selective catalyst reduction device, and the reducing agent pipe extends between the first partition part and the vehicle body cover. Therefore, radiant heat from the selective catalyst reduction device is blocked by the first partition part so that heating of the reducing agent pipe can be prevented. As a result, when the reducing agent flowing through the reducing agent pipe is a urea aqueous solution, the urea aqueous solution is prevented from changing to ammonia.

(2) The wheel loader preferably further includes a supporting member. The supporting member supports the reducing agent pipe so that the reducing agent pipe extends between the vehicle body cover and the partition plate in a state of being a certain distance away from the partition plate.

According to this configuration, contact between the reducing agent pipe and the partition plate can be prevented due to the supporting member supporting the reducing agent pipe. Since the partition plate is heated by the radiant heat from the selective catalyst reduction device, the transfer of heat from the partition plate to the reducing agent pipe can be prevented by preventing the reducing agent pipe from coming into contact with the partition plate.

(3) The vehicle body cover preferably has a bulging part that includes a pipe installation port and that bulges to the outside. The reducing agent pipe is introduced into the engine room through the pipe installation port.

According to this configuration, the reducing agent pipe is introduced into the engine room through the pipe installation port of the bulging part. Since the bulging part bulges to the outside, the reducing agent pipe can be introduced into the engine room without severe bending. If the reducing agent pipe extends along the bulging part, the reducing agent pipe can be disposed in a location further away from the selective catalyst reduction device since the bulging part bulges to the outside.

(4) The partition plate preferably has a second partition part disposed between the injection device and the selective catalyst reduction device. According to this configuration, radiant heat radiating from the selective catalyst reduction device toward the injection device can be blocked by the second partition part.

(5) The wheel loader preferably further includes a cab, an operating fluid tank, and a relay member. The cab is provided with a driver seat therein. The operating fluid tank is disposed between the cab and the engine room. The relay member is disposed beside the operating fluid tank. The reducing agent pipe has a first pipe that connects the relay member and the injection device, and a second pipe that connects the relay member and the reducing agent pump.

According to this configuration, since the reducing agent pipe is configured by two pipes being the first pipe and the second pipe, the length of pipe to be handled can be reduced and replacement work can be facilitated. Further, if the replacement periods of the first pipe and the second pipe are different, each of the pipes can be replaced at an appropriate period and the pipes are not replaced in a wasteful manner.

(6) The reducing agent pipe preferably has a heating wire for heating the reducing agent flowing therein, and the heating wire of the first pipe and the heating wire of the second pipe are preferably controlled independently. According to this configuration, energy saving can be achieved since heating can be performed for only the first pipe or for the second pipe when heating is required. Since the second pipe that connects the relay member and the reducing agent pump is generally exposed to the atmosphere, the opportunity to heat the second pipe by the heating wire occurs more often than with the first pipe.

(7) The reducing agent is preferably a urea aqueous solution. When the urea aqueous solution is injected into the exhaust gas under high temperatures, the urea aqueous solution is hydrolyzed to obtain ammonia. The ammonia is chemically reacted with a nitrogen oxide which is reduced to nitrogen and water.

According to the present invention, heating of the reducing agent pipe can be prevented.

DETAILED DESCRIPTION OF EMBODIMENTS

Figure 1:
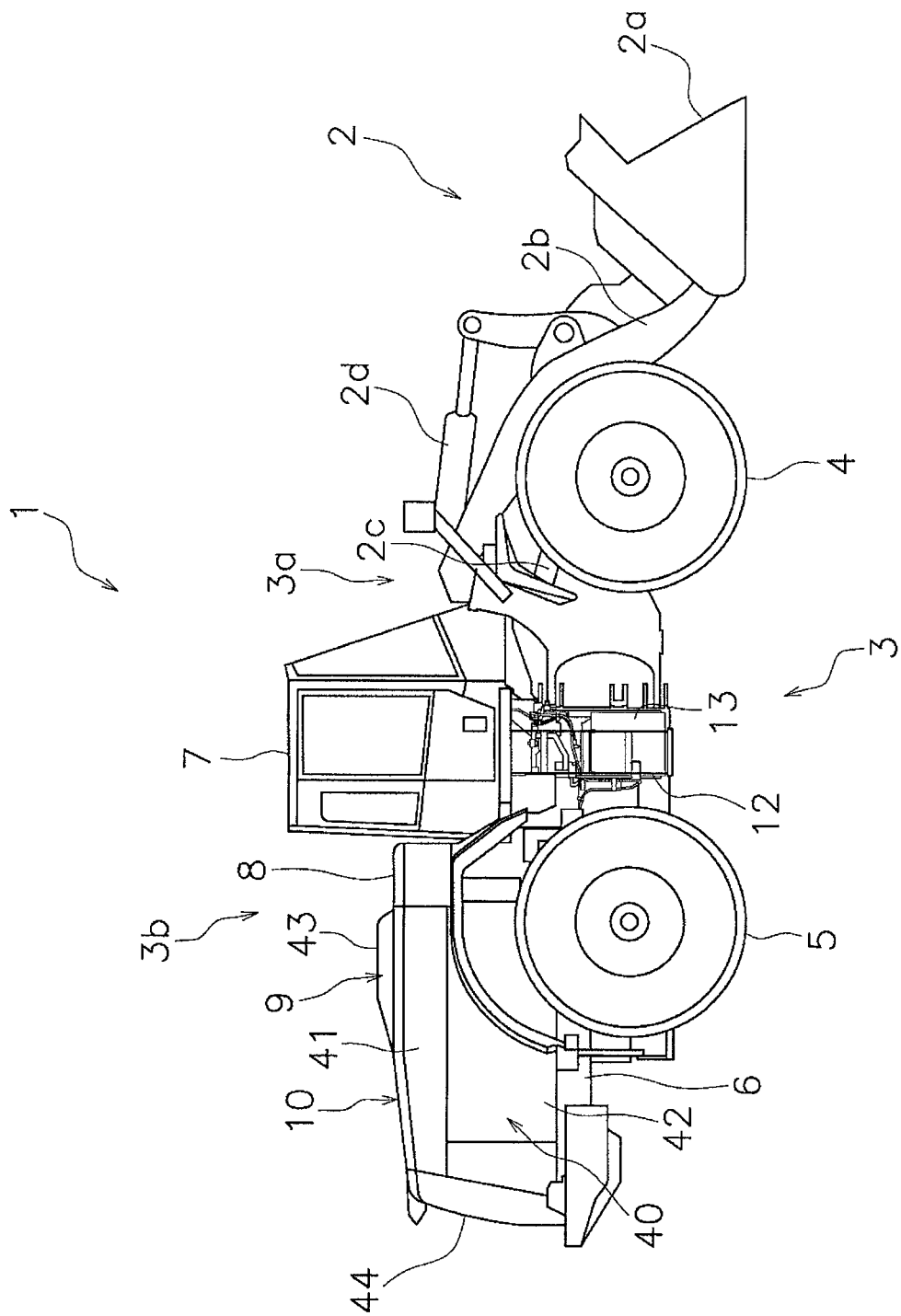
FIG. 1 is a right side view of a wheel loader.

An embodiment of a wheel loader according to the present invention will be explained below with reference to the drawings. FIG. 1 is a right side view of a wheel loader. In the following explanation, "front" and "rear" refer to the front and the rear of a vehicle body 3. That is, the right side is the "front" and the left side is the "rear" in FIG. 1. In the following explanation, "right," "left," "up," and "down" indicate directions relative to a state of looking forward from the operating cabin, and "vehicle width direction" and "crosswise direction" have the same meaning. Further, "width" signifies a length in the crosswise direction.

As illustrated in FIG. 1, the wheel loader 1 includes a work implement 2, a vehicle body 3, front wheels 4, and rear wheels 5. The wheel loader 1 is capable of traveling due to the rotation of the front wheels 4 and the rear wheels 5, and desired work can be conducted using the work implement 2.

The work implement 2 is a mechanism driven by operating fluid pressurized by a hydraulic pump (not illustrated), and is disposed at the front of the vehicle body 3. The work implement 2 includes a bucket 2a, booms 2b, lift cylinders 2c, and a bucket cylinder 2d. The bucket 2a is attached to the tip of the booms 2b. The booms 2b are members for lifting the bucket 2a and are mounted at the front part of a belowmentioned front vehicle section 3a. The lift cylinders 2c drive the booms 2b with pressure oil discharged from the hydraulic pump. The bucket cylinder 2d drives the bucket 2a with pressure oil discharged from the hydraulic pump.

The vehicle body 3 includes the front vehicle section 3a and a rear vehicle section 3b. The front vehicle section 3a and the rear vehicle section 3b are coupled to each other in a manner that allows swinging in the crosswise direction. The work implement 2 and the front wheels 4 are provided on the front vehicle section 3a, and the rear wheels 5 are provided on the rear vehicle section 3b. When the front vehicle section 3a swings with respect to the rear vehicle section 3b so that the front vehicle section 3a faces the left side, a large space is formed in front of a belowmentioned urea aqueous solution tank 13.

The rear vehicle section 3b includes a rear frame 6, a cab 7, an operating fluid tank 8, an engine room 9, a cooling room 10, and a cooling fan 11. The rear frame 6 is a frame that constitutes the entire shape of the rear vehicle section 3b, and supports the rear wheels 5, the cab 7, the operating fluid tank 8, an engine 18, and a cooling unit 19.

An operating cabin is provided inside the cab 7, and various operating members and an operating panel are provided inside the cab 7. The operating fluid tank 8 is disposed to the rear of the cab 7, and a plurality of hydraulic pumps (not shown) are disposed below the operating fluid tank 8. Operating fluid for driving the work implement 2 and the like is stored in the operating fluid tank 8, and the operating fluid is supplied to the work implement 2 and the like by the hydraulic pumps.

A ladder 12 for ascending to and descending from the cab 7 is disposed on the right side of the cab 7. The ladder 12 is fixed to the rear frame 6 and extends from a lower edge part of the cab 7 to close to the ground. Since the ladder 12 is provided a certain distance away from the rear frame 6, a space is formed between the ladder 12 and the rear frame 6, that is, behind the ladder 12.

Figure 2:
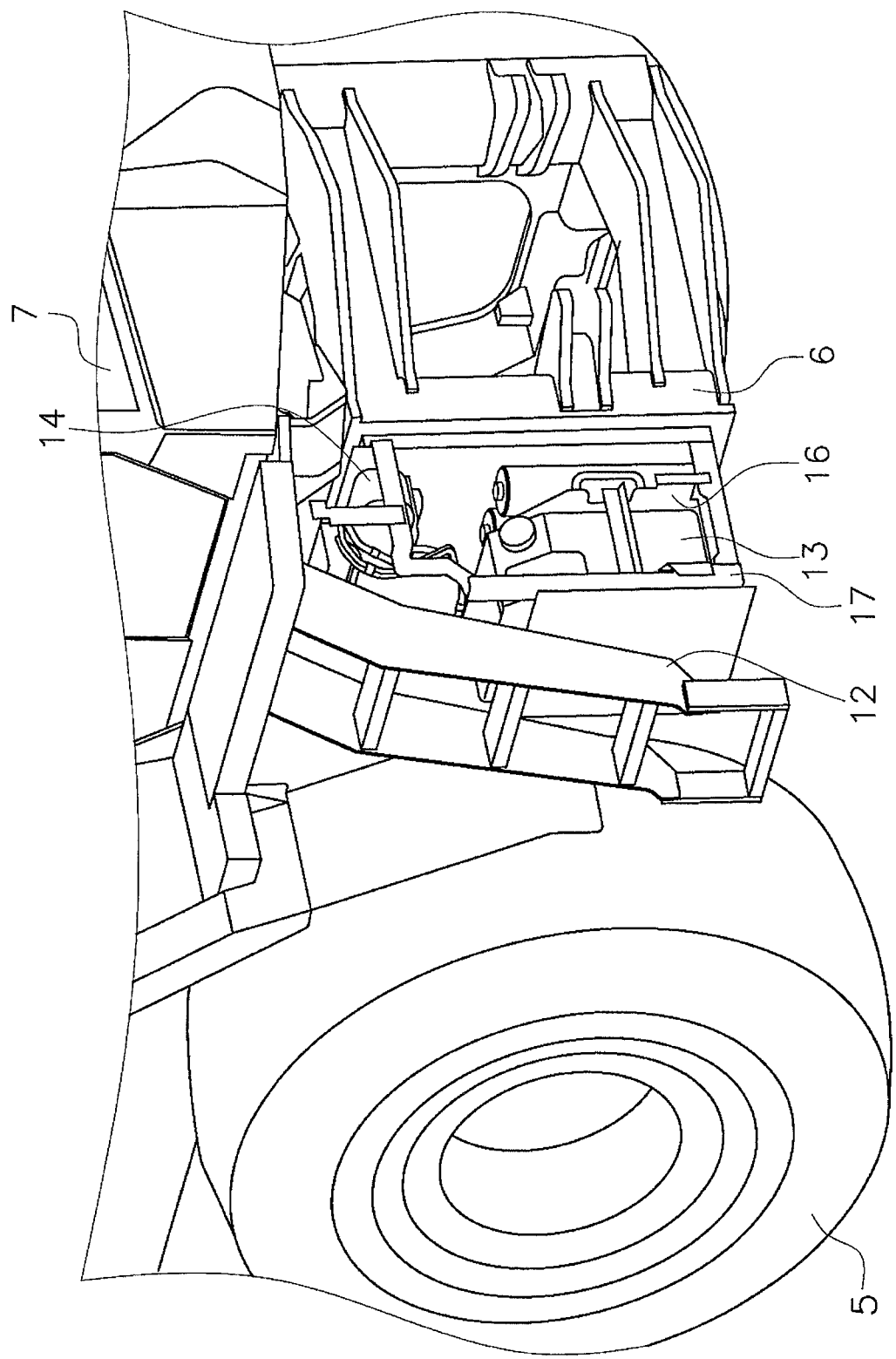
FIG. 2 is a perspective view around a urea aqueous solution tank as seen from the right front.
Figure 3:
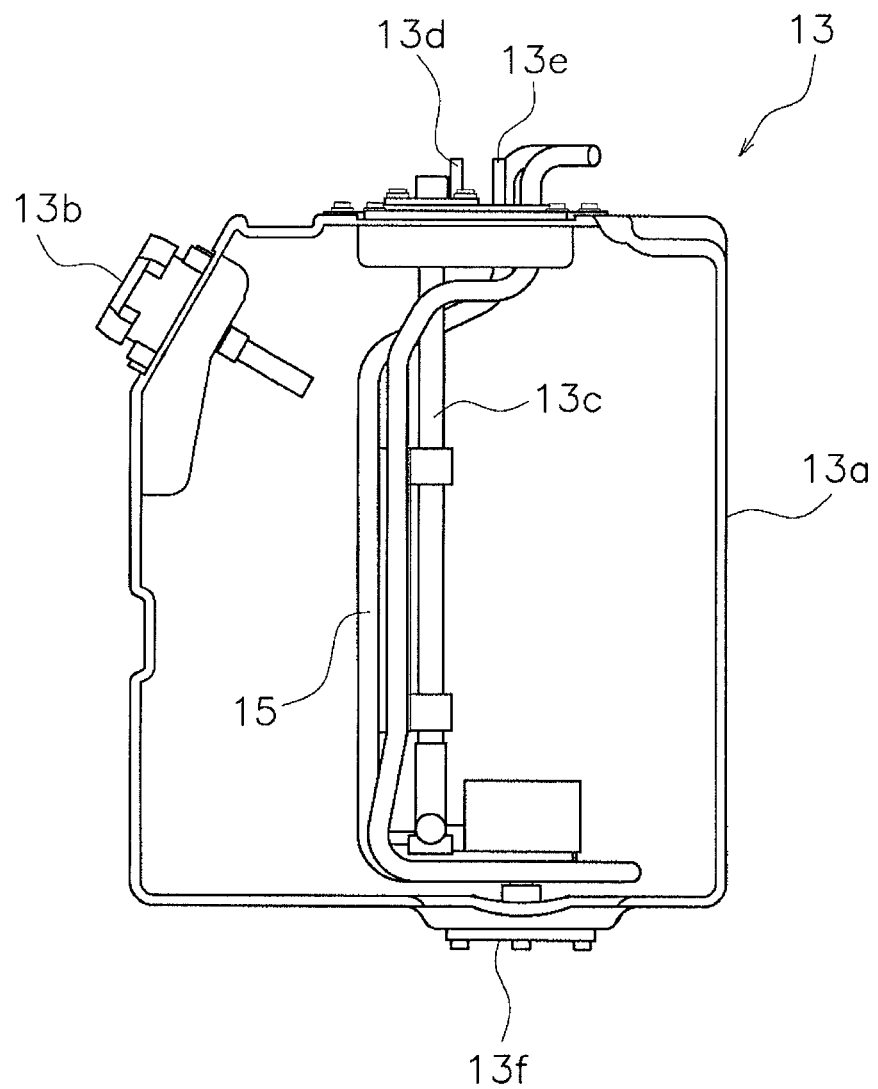
FIG. 3 is a side cross-section of a urea aqueous solution tank as seen from the left side.

FIG. 2 is a perspective view around the urea aqueous solution tank 13 as seen from the left front, and FIG. 3 is a side cross-section of the urea aqueous solution tank 13 as seen from the left side. As illustrated in FIG. 2, the urea aqueous solution tank (example of a reducing agent tank) 13 is disposed in the space formed behind the ladder 12. As illustrated in FIG. 3, the urea aqueous solution tank 13 includes a tank body 13a, a replenishment inlet 13b, a level gauge 13c, a first port 13d, and a second port 13e.

The tank body 13a has roughly a rectangular parallelepiped shape and a urea aqueous solution (example of the reducing agent) is contained therein. A projecting part 13f that has a circular shape in a plan view and that projects downward is formed on the bottom surface of the tank body 13a. The projecting part 13f is located further toward the rear than a middle portion in the front-back direction. The replenishment inlet 13b is provided on the top of the tank body 13a and the urea aqueous solution is poured into the tank body 13a from the replenishment inlet 13b. The replenishment inlet 13b faces the front side in a state in which the urea aqueous solution tank 13 is provided behind the ladder 12.

The level gauge 13c extends from the top surface of the tank body 13a to the bottom surface thereof inside the tank body 13a, and measures a remaining amount of the urea aqueous solution inside the tank body 13a. The first and second ports 13d and 13e are formed on the top surface of the tank body 13a. The first and second ports 13d and 13e are each connected to a urea aqueous solution pump (example of a reducing agent pump) 14 via pipes. The urea aqueous solution pump 14 is disposed above the urea aqueous solution tank 13 behind the ladder 12 (see FIG. 2). The urea aqueous solution pump 14 discharges the urea aqueous solution sucked in from the inside of the tank body 13a through the first port 13d to a belowmentioned injection device 24 through a urea aqueous solution pipe (example of a reducing agent pipe) 25. The urea aqueous solution pump 14 returns an excess amount of the urea aqueous solution to the inside of the tank body 13a through the second port 13e.

A cooling water return pipe 15 extends inside the tank body 13a. The cooling water return pipe 15 is connected to the belowmentioned engine 18 and a radiator 19 so that cooling water is able to flow inside the tank body 13a. The cooling water is water that absorbs heat from the engine 18 to become heated water. Freezing of the urea aqueous solution stored inside the tank body 13a can be prevented due to the cooling water return pipe 15 through which the heated water flows being provided inside the tank body 13a.

As illustrated in FIG. 2, the urea aqueous solution tank 13 is accommodated inside a supporting frame 17 in a state of being retained by a retaining member 16. The supporting frame 17 is fixed to the rear frame 6 in the space behind the ladder 12. The urea aqueous solution tank 13 is accommodated within the space of the supporting frame 17. The supporting frame 17 includes rail parts 17a (see FIG. 5) and a bottom plate 17b (see FIG. 5). Each rail part 17a is a member that allows the retaining member 16 to be pulled forward as described below, and includes a first sloping part 17c and a second sloping part 17d. The bottom plate 17b supports, from the bottom, the retaining member 16 that retains the urea aqueous solution tank 13.

Figure 4:
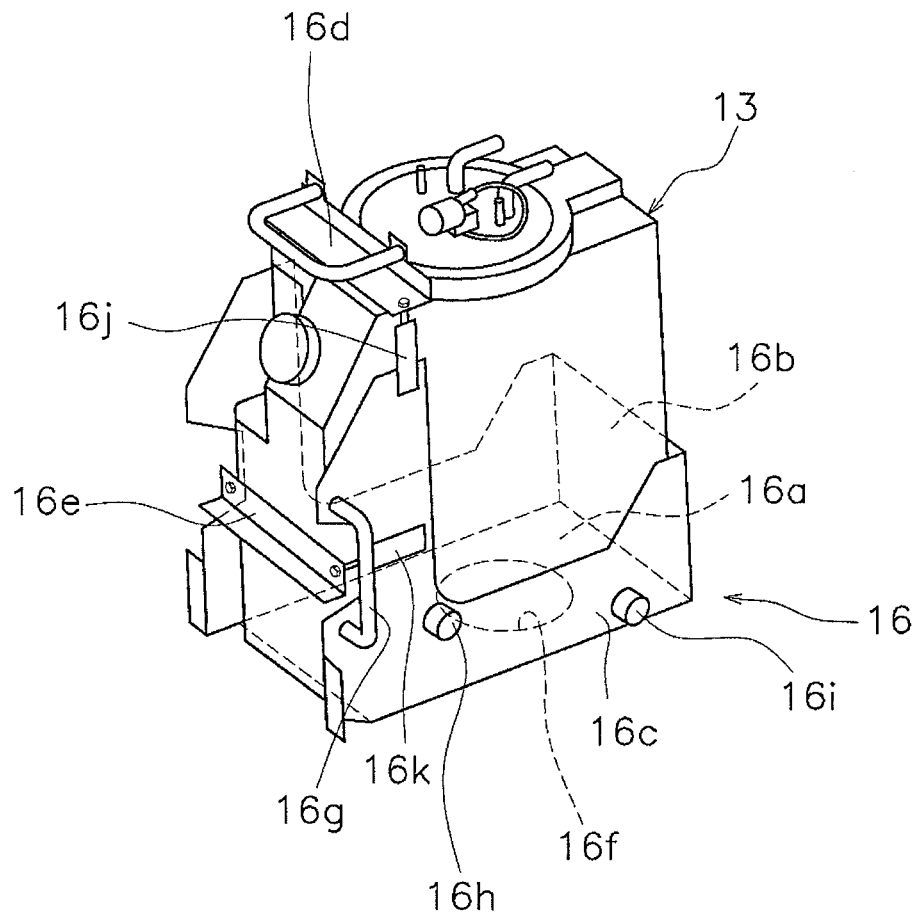
FIG. 4 is a perspective view of a retaining member while retaining the urea aqueous solution tank.

FIG. 4 is a perspective view of the retaining member 16 in a state of retaining the urea aqueous solution tank 13. The retaining member 16 is a member for retaining the urea aqueous solution tank 13. As illustrated in FIG. 4, the retaining member 16 has a bottom plate 16a, a back plate 16b, a pair of side plates 16c, a first regulating bar 16d, and a second regulating bar 16e.

The bottom plate 16a of the retaining member 16 has a rectangular shape and is formed with an opening part 16f. While the retaining member 16 is retaining the urea aqueous solution tank 13, the projecting part 13f of the urea aqueous solution tank 13 projects downward and penetrates the opening part 16f of the bottom plate 16a. The back plate 16b extends upward from the rear edge of the bottom plate 16a and the pair of side plates 16c extends upward from both side edges of the bottom plate 16a. The urea aqueous solution tank 13 is accommodated in a space defined by the bottom plate 16a, the back plate 16b and the pair of side plates 16c.

The front part of each of the pair of side plates 16c retains the urea aqueous solution tank 13 from a lower part to an upper part. The middle part and the rear part of each of the pair of side plates 16c retain the lower part of the urea aqueous solution tank 13. Specifically, the front parts of the side plates 16c extend upward further than the middle and rear parts thereof. The rear parts of the side plates 16c extend further upward than the middle parts thereof, and have the same height as the back plate 16b. In this way, since the retaining member 16 does not retain the entire side surfaces of the urea aqueous solution tank 13 with the pair of side plates 16c and the middle parts of the side surfaces of the urea aqueous solution tank 16 are exposed, deformation of the retaining member 16 can be prevented even if the urea aqueous solution freezes and the urea aqueous solution tank 13 expands.

The side plates 16c of the retaining member 16 have a handle 16g for an operator to pull both the retaining member 16 and the urea aqueous solution tank 13 forward and to return the same to the original position. A front part of the side plates 16c has a first convex part 16h in the front part thereof, and a second convex part 16i in the rear part thereof, and both the first convex part 16h and the second convex part 16i project sideways. The first convex part 16h is located higher than the second convex part 16i. The first and second convex parts 16h, 16i slide in the front-back direction on the rail part 17a of the supporting frame 17.

Mounting brackets 16j extend upward from the upper edges of the front parts of the pair of side plates 16c. The first regulating bar 16d is attached to the side plates 16c through the mounting brackets 16j. The first regulating bar 16d extends in the vehicle width direction and both edges thereof are attached to the mounting brackets 16j with bolts and nuts and the like. The first regulating bar 16d is located above the front part of the urea aqueous solution tank 13 and regulates movement of the urea aqueous solution tank 13 upward and consequently prevents the urea aqueous solution tank 13 from jumping upward from the retaining member 16 while the retaining member 16 is retaining the urea aqueous solution tank 13.

Mounting brackets 16k extend forward from the middle parts of the front parts of the pair of side plates 16c. The second regulating bar 16e is attached to the side plates 16c through the mounting brackets 16k. The second regulating bar 16e extends in the vehicle width direction and both edges thereof are attached to the mounting brackets 16k with bolts and nuts and the like. The second regulating bar 16e is located in front of the urea aqueous solution tank 13 and regulates movement of the urea aqueous solution tank 13 forward and consequently prevents the urea aqueous solution tank 13 from jumping forward from the retaining member 16 while the retaining member 16 is retaining the urea aqueous solution tank 13.

Figure 5:
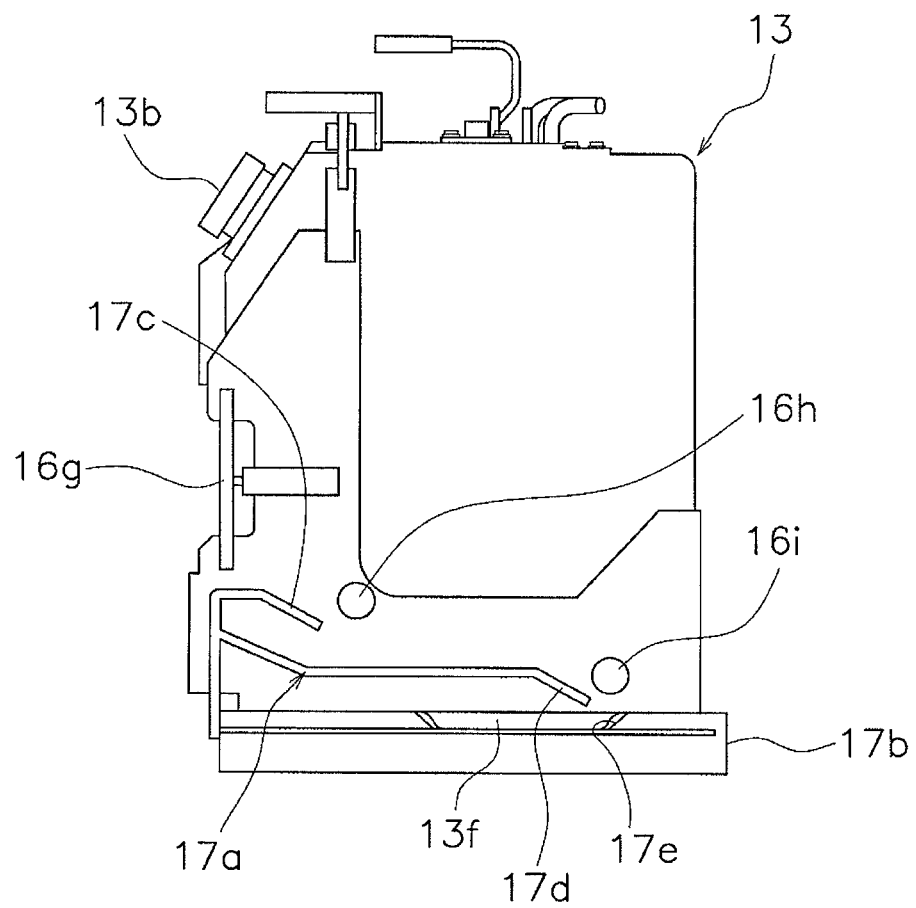
FIG. 5 is a left side view illustrating a state of the retaining member that retains the urea aqueous solution tank before sliding.
Figure 6:
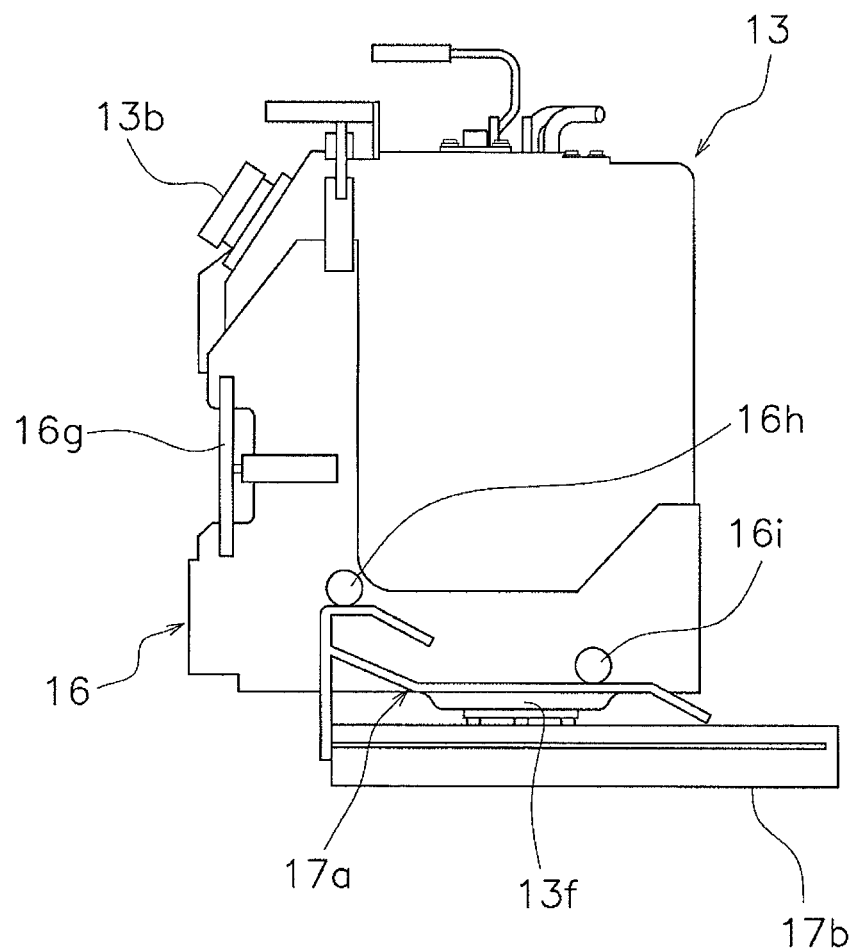
FIG. 6 is a left side view illustrating a state of the retaining member that retains the urea aqueous solution tank while sliding.
Figure 7:
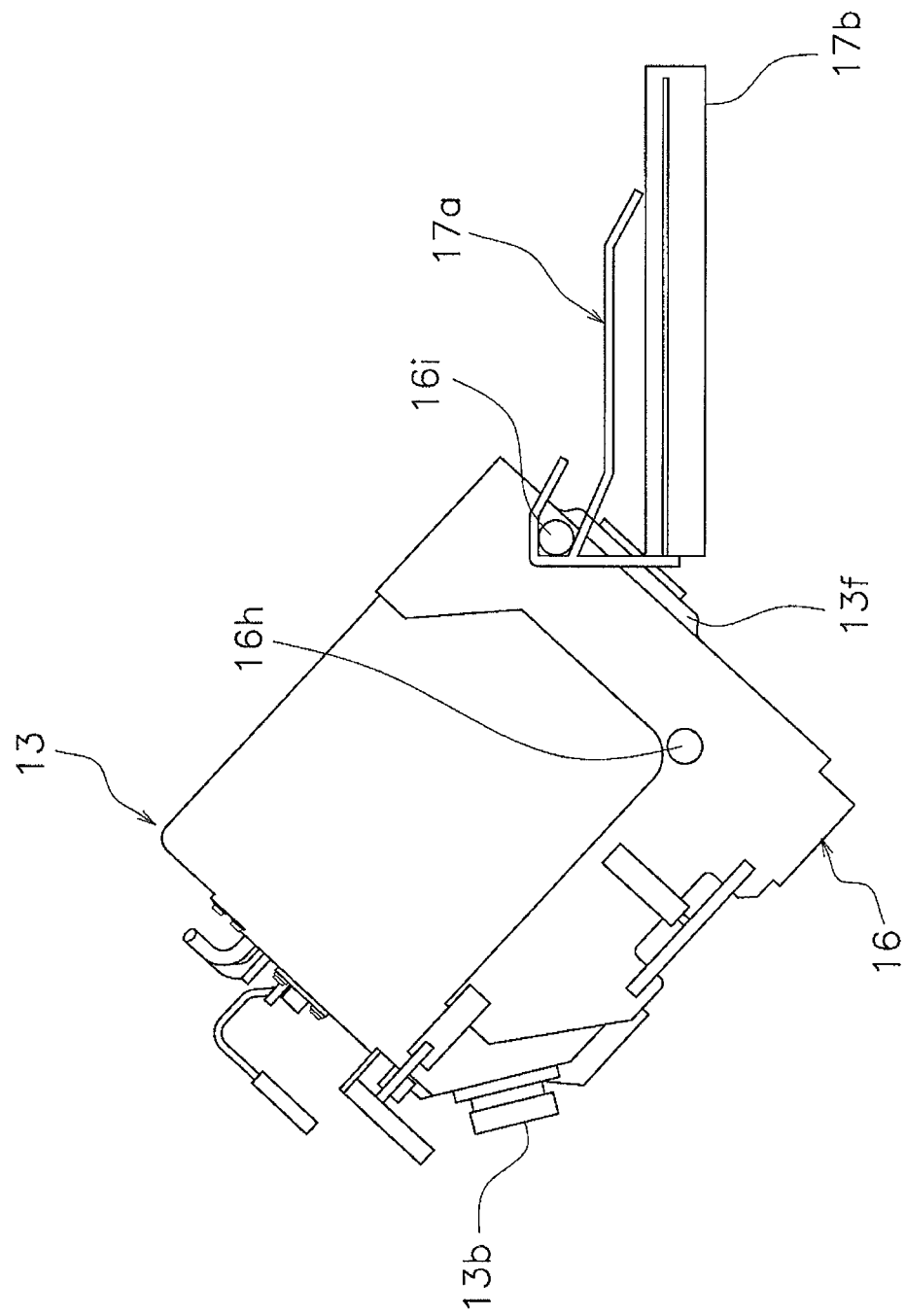
FIG. 7 is a left side view illustrating a state of the retaining member that retains the urea aqueous solution tank after sliding.

FIGS. 5 to 7 illustrate an appearance of the retaining member 16 that retains the urea aqueous solution tank 13 sliding forward. FIG. 5 illustrates a state of the retaining member 16 that retains the urea aqueous solution tank 13 before sliding, FIG. 6 illustrates a state of the retaining member 16 that retains the urea aqueous solution tank 13 while sliding, and FIG. 7 illustrates a state of the retaining member 16 that retains the urea aqueous solution tank 13 after sliding.

As illustrated in FIG. 5, in the state before sliding, the first convex part 16h of the side plates 16c of the retaining member 16 is located to the rear of the first sloping part 17c of the rail part 17a, and the second convex part 16i is located to the rear of the second sloping part 17d. In this state, the projecting part 13f of the urea aqueous solution tank 13 is engaged with a concave part 17e formed in the bottom plate 17b of the supporting frame 17.

From the state of FIG. 5, when the operator grabs the handle 16g and pulls the retaining member 16 forward, the first convex part 16h of the retaining member 16 slides along the first sloping part 17c of the rail part 17a and the second convex part 16i slides along the second sloping part 17d. As a result, the retaining member 16 slides forward and moves upward due to the portions of the first and second sloping parts 17c, 17d, and the projecting part 13f of the urea aqueous solution tank 13 slides out of the concave part 17e of the bottom plate 17b of the supporting frame 17. The retaining member 16 that retains the urea aqueous solution tank 13 then enters the state illustrated in FIG. 6.

From the state in FIG. 6, when the operator pulls the retaining member 16 further forward, the first and second convex parts 16h, 16i slide forward along the rail part 17a. When the projecting part 13f of the urea aqueous solution tank 13 reaches the front edge of the bottom plate 17*b* of the supporting frame 17, the urea aqueous solution tank 13 rotates, as if falling forward, around the contact point between the projecting part 13*f* of the urea aqueous solution tank 13 and the front edge of the bottom plate 17*b* as illustrated in FIG. 7. The second convex part 16*i* of the retaining member 16 engages with a front tip part of the U-shaped rail part 17*a* so that the rotation of the urea aqueous solution tank 13 is stopped in the state illustrated in FIG. 7. In this way, since the urea aqueous solution tank 13 is pulled forward from the supporting frame 17 so that the urea aqueous solution tank 13 is slanted forward, maintenance on the sensors such as the level gauge 13*c* disposed on the top surface of the urea aqueous solution tank 13 is facilitated. Further, the removal of the urea aqueous solution tank 13 from the retaining member 16 is also facilitated. The urea aqueous solution tank 13 can be taken out of the retaining member 16 after removing the first and second regulating bars 16*d*, 16*e*.

Figure 8:
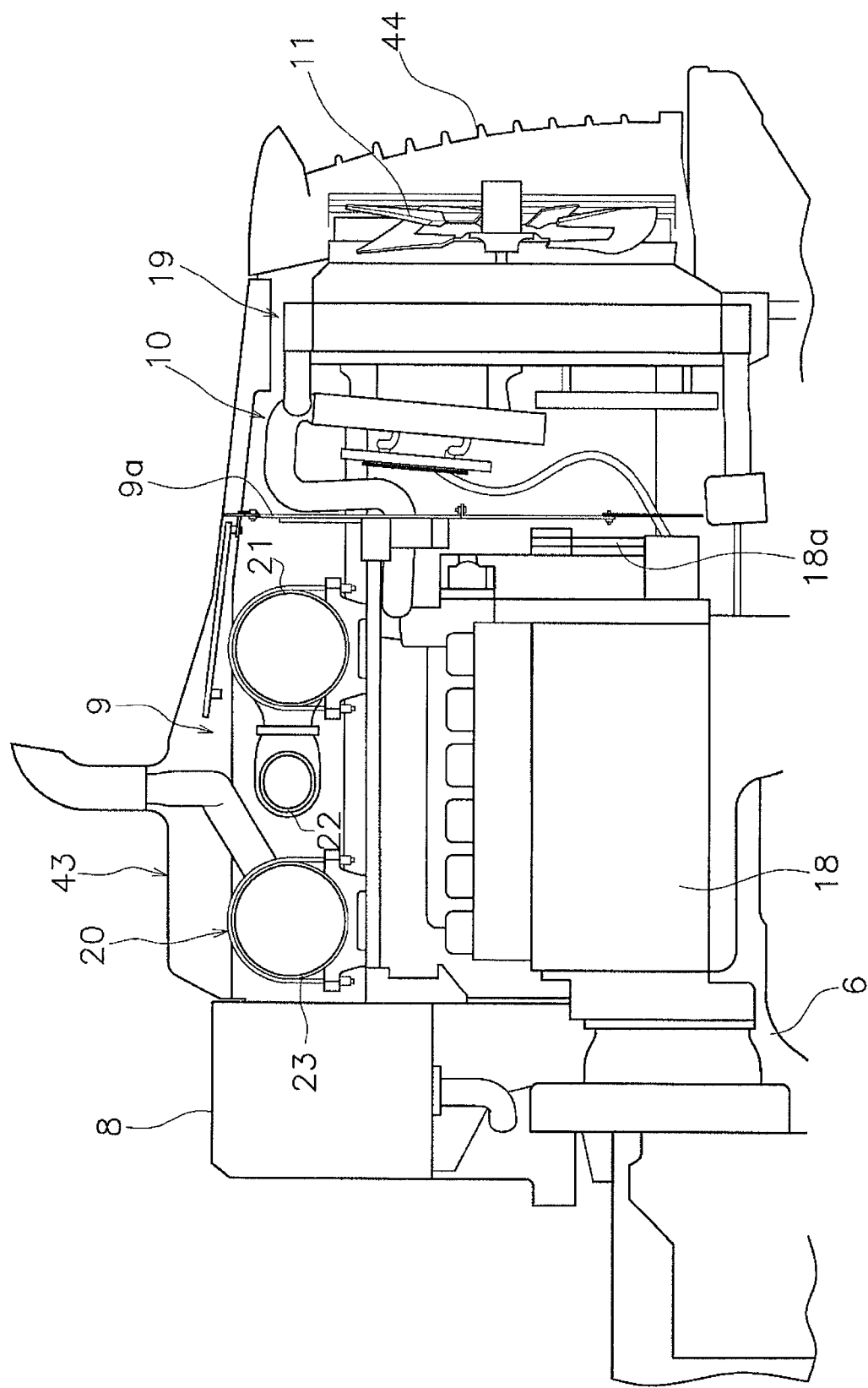
FIG. 8 is a side cross-section of the rear vehicle section as seen from the left side.

FIG. 8 is a side cross-section of the rear vehicle section 3*b* as seen from the left. As illustrated in FIG. 8, the engine room 9 is disposed behind the operating fluid tank 8. The side planes and the top plane of the engine room 9 are defined by a vehicle body cover 40 (see FIG. 1), and the rear plane thereof is defined by a partition wall 9*a*. The vehicle body cover 40 is attached to the rear frame 6. The vehicle body cover 40 is divided into a plurality of portions and each of the portions can be opened and closed independently in order to facilitate access to the inside parts (engine room 9 and cooling room 10) of the rear vehicle section 3*b*.

Specifically, the vehicle body cover 40 mainly has an upper cover 41, a lower cover 42, and a top plate 43 as illustrated in FIG. 1. The upper cover 41 is a member for covering an upper side surface part of the rear vehicle section 3*b*. The upper cover 41 is fixed to the rear frame 6 with a hinge at the front edge part of the engine room 9, that is, at the border part between the engine room 9 and the operating fluid tank 8. The upper cover 41 is able to open and close in the horizontal direction around the hinge. The lower cover 42 is a member for covering a lower side surface part of the rear vehicle section 3*b*. The lower cover 42 is fixed to the rear frame 6 with a hinge at the end part on the upper cover 41 side, and can be opened and closed in the vertical direction around the hinge. The top plate 43 is a member for covering the upper surface of the rear vehicle section 3*b*.

As illustrated in FIG. 8, the cooling room 10 is disposed to the rear of the engine room 9, and the cooling unit 19 is accommodated inside the cooling room 10. The cooling unit 19 is a unit for reducing the temperature of liquids or gases flowing inside the cooling unit 19, and may be exemplified by a condenser or a radiator and the like. The cooling room 10 has a front plane defined by the partition wall 9*a*, side planes defined by the vehicle body cover 40, a top plane defined by the vehicle body cover 40, and a rear plane defined by a grille 44. Air inside the cooling room 10 is exhausted to the outside in the rear through an opening part of the grille 44 due to the cooling fan 11 being rotated.

As illustrated in FIG. 8, the engine room 9 accommodates the engine 18 and the exhaust gas post-processing device 20. The engine room 9 further accommodates a belt 18*a* and the like for transmitting torque from the engine 18 to auxiliary equipment. The engine 18 is disposed in a lower part of the engine room 9 and is an engine in which the crankshaft extends in the front-back direction, that is, a so-called vertical mounted engine.

Figure 9:
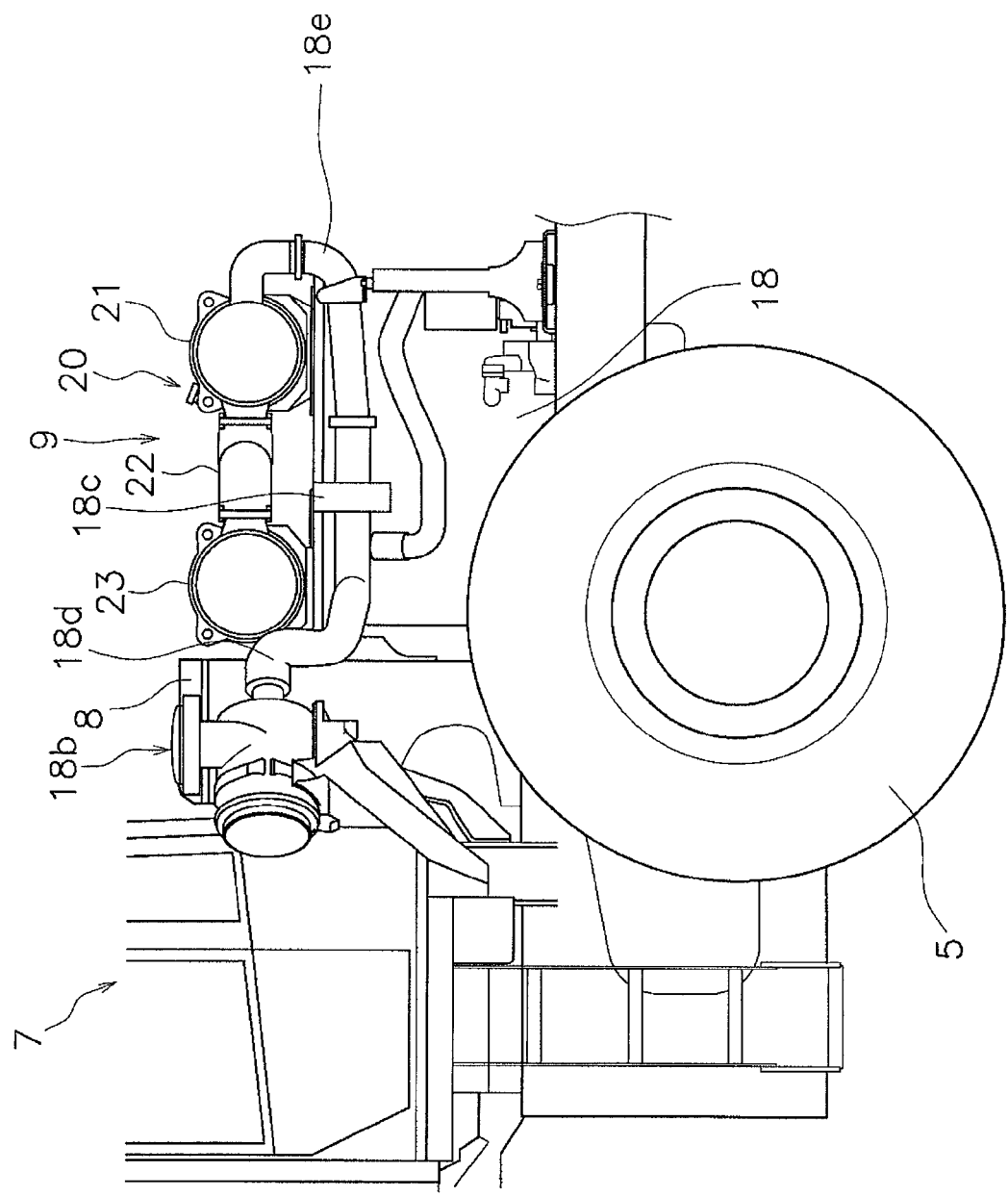
FIG. 9 is a side view of the vicinity of the engine room seen from the left side.

FIG. 9 is a side view of the vicinity of the engine room 9 seen from the left side. The description of the vehicle body cover 40 is omitted in FIG. 9 to facilitate explanation. As illustrated in FIG. 9, an air cleaner 18*b* is disposed on the left side of the operating fluid tank 8. The air cleaner 18*b* removes foreign matter from the air sent to the engine 18.

A turbo charger 18*c* is connected to the air cleaner 18*b* via a flexible intake pipe 18*d*. The turbo charger 18*c* rotates a turbine with exhaust gas from the engine 18 and compresses air from the air cleaner 18*b* and forces the air into the engine 18. The turbo charger 18*c* is disposed on the left edge side of the engine room. Specifically, the turbo charger 18*c* is disposed on the left side of the engine 18 inside the engine room 9.

Figure 10:
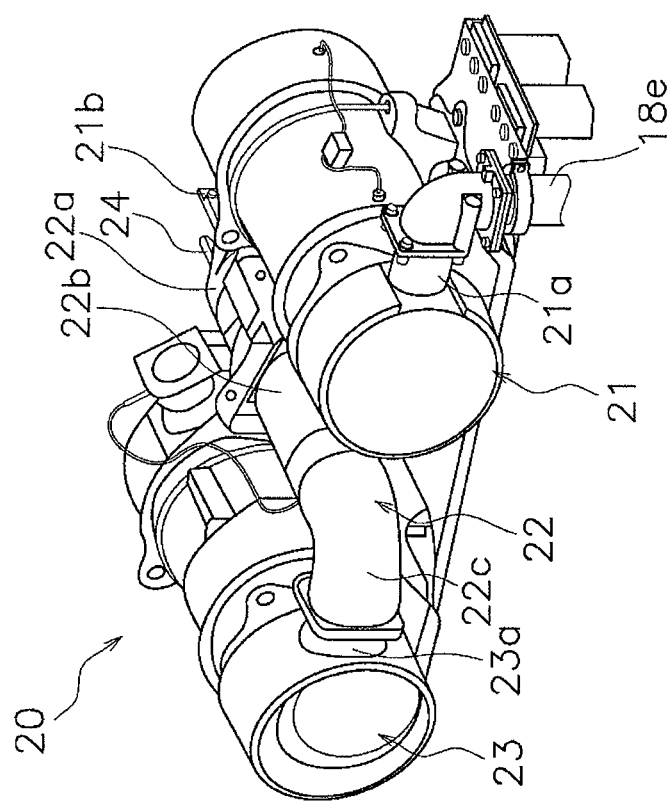
FIG. 10 is a perspective view of the exhaust gas post-processing device as seen from the left rear.

The exhaust gas post-processing device 20 accommodated in the engine room 9 is disposed in an upper part of the engine room 9. Specifically, the exhaust gas post-processing device 20 is disposed above the engine 18. FIG. 10 is a perspective view of the exhaust gas post-processing device 20 as seen from the left rear. As illustrated in FIG. 10, the exhaust gas post-processing device 20 includes, in order of the flow of exhaust gas, a diesel particulate filtering device 21, a connecting pipe 22, and a selective catalyst reduction device 23. An injection device 24 is connected to the connecting pipe 22.

The diesel particulate filtering device 21 is connected to the engine 18 through a pipe 18*e* and is a device for treating the exhaust gas exhausted from the engine 18. Specifically, the diesel particulate filtering device 21 is a device that collects, in a filter, particulate matter such as soot in the exhaust gas emitted from the engine 18. The diesel particulate filtering device has an exhaust gas inlet 21*a* and an exhaust gas outlet 21*b*. The diesel particulate filtering device 21 sucks in exhaust gas from the engine 18 through the exhaust gas inlet 21*a*. The diesel particulate filtering device 21 exhausts the treated exhaust gas inside the diesel particulate filtering device 21 through the exhaust gas outlet 21*b*. The diesel particulate filtering device 21 burns the collected particulate matter with a heater provided with the filter.

The connecting pipe 22 connects the diesel particulate filtering device 21 and the selective catalyst reduction device 23. The entire connecting pipe 22 is formed in an S shape and includes a first bend section 22*a*, a linear section 22*b*, and a second bend section 22*c*. The first bend section 22*a* is connected to the exhaust gas outlet 21*b* of the diesel particulate filtering device 21 and the second bend section 22*c* is connected to the exhaust gas inlet 23*a* of the selective catalyst reduction device 23. The linear section 22*b* extends between the first bend section 22*a* and the second bend section 22*c*.

The injection device 24 is attached to the first bend section 22*a*. The injection device 24 is disposed on the right edge part inside the engine room 9. The injection device 24 injects the urea aqueous solution, which is sucked up from the urea aqueous solution tank 13 by the urea aqueous solution pump 14 and is delivered via the urea aqueous solution pipe 25, into the connecting pipe 22 in order to mix the urea aqueous solution into the exhaust gas as a reducing agent. The mixed urea aqueous solution is hydrolyzed due to the heat of the exhaust gas to become ammonia, and the ammonia is fed with the exhaust gas through the connecting pipe 22 to the selective catalyst reduction device 23.

The selective catalyst reduction device 23 purifies by reducing the nitrogen oxides in the exhaust gas by using the ammonia from the injection device 24 as the reducing agent.

The diesel particulate filtering device 21, the connecting pipe 22, and the selective catalyst reduction device 23 are disposed parallel to each other. Specifically, the diesel particulate filtering device 21 and the selective catalyst reduction device 23 are both substantially cylindrical. The direction in which the center axes of the diesel particulate filtering device 21 and the selective catalyst reduction device 23 extends is the longitudinal direction of the diesel particulate filtering device 21 and the selective catalyst reduction device 23. The longitudinal direction of the devices is arranged to extend in the crosswise direction. As a result, the exhaust gas inlet 21a of the diesel particulate filtering device 21 is disposed on the left side inside the engine room 9. The exhaust gas outlet 21b of the diesel particulate filtering device 21 is disposed on the right side inside the engine room 9.

The linear section 22b of the connecting pipe 22 is also substantially cylindrical. The direction in which the center axis of the linear section 22b extends is the longitudinal direction of the connecting pipe 22. The longitudinal direction of the connecting pipe 22 is disposed so as to be aligned in the vehicle width direction.

Figure 11:
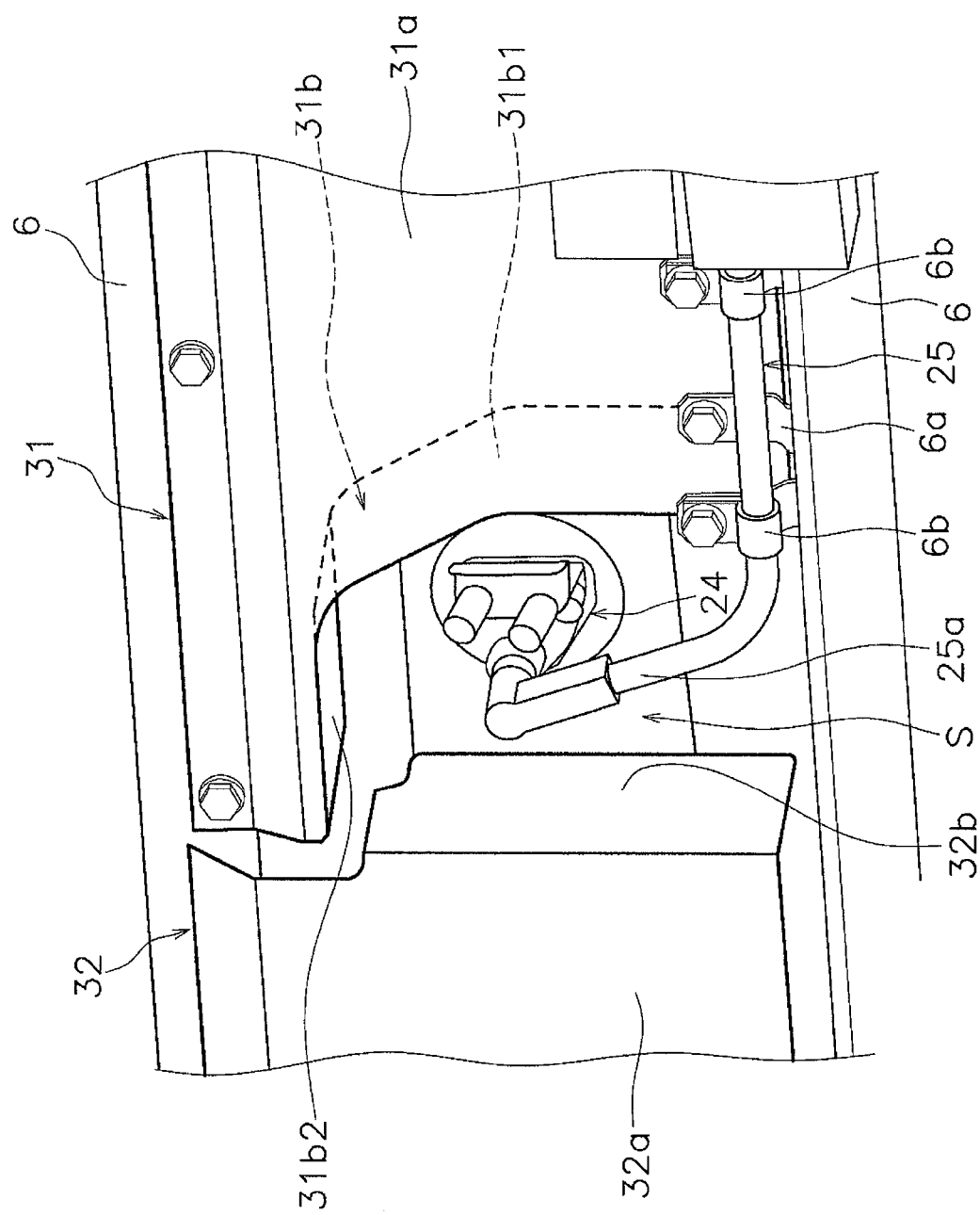
FIG. 11 is a perspective view of a detail around an injection device as seen from the right front.
Figure 12:
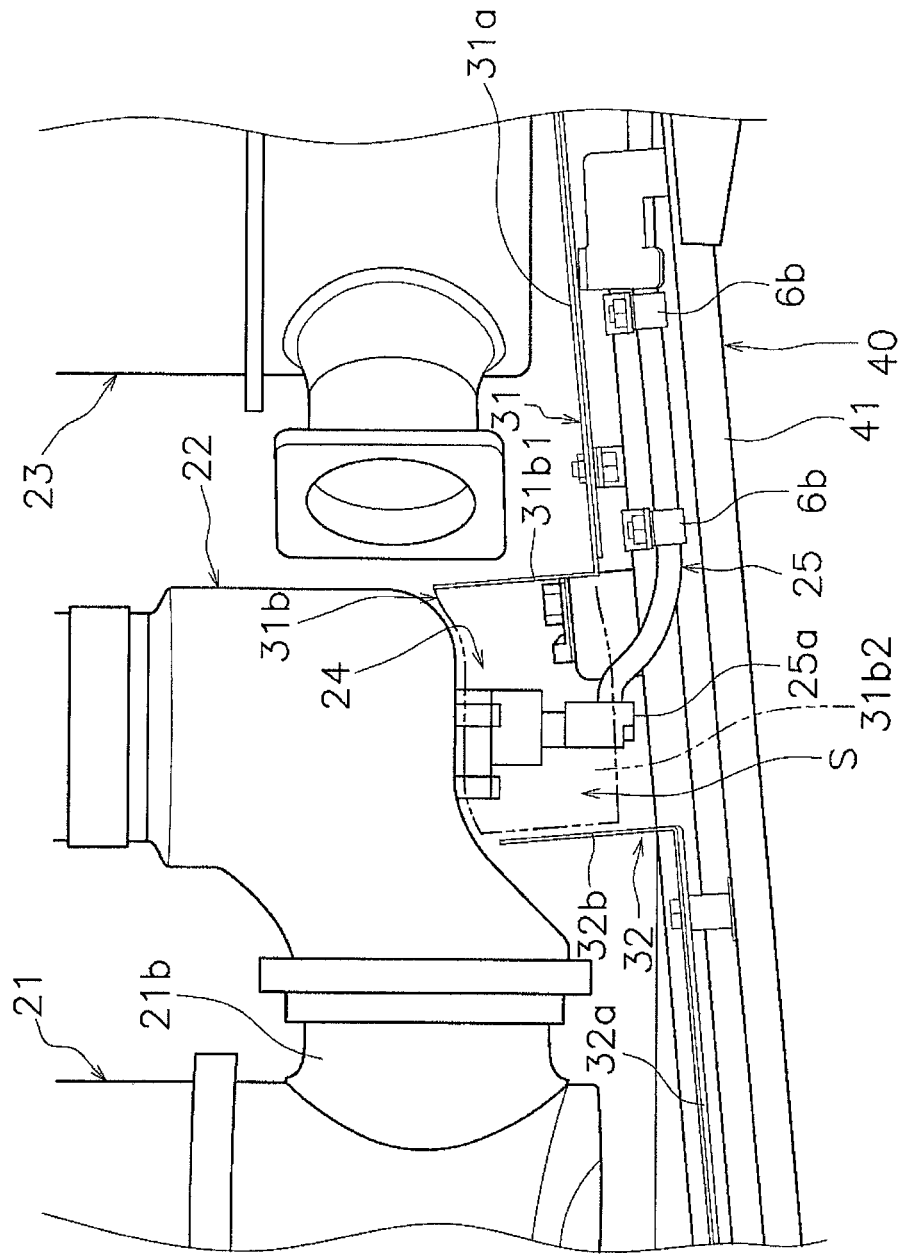
FIG. 12 is a plan view of the vicinity of the injection device.

FIG. 11 is a perspective view of the vicinity of the injection device 24 as seen from the right front, and FIG. 12 is a plan view of the vicinity of the injection device 24. As illustrated in FIGS. 11 and 12, a first partition plate 31 is disposed between the selective catalyst reduction device 23 and the vehicle body cover 40. Specifically, the first partition plate 31 is disposed between the selective catalyst reduction device 23 and the upper cover 41. A second partition plate 32 is disposed between the diesel particulate filtering device 21 and the vehicle body cover 40. Specifically, the second partition plate 32 is disposed between the diesel particulate filtering device 21 and the upper cover 41. The first partition plate 31 and the second partition plate 32 are disposed in a row in the front-back direction. The first partition plate 31 is disposed in front of the second partition plate 32. A partition plate is divided into two to constitute the first partition plate 31 and the second partition plate 32, and an interval between the first partition plate 31 and the second partition plate 32 is provided to create a gap for pipes and the like to pass through.

The first partition plate 31 has a base part (example of a first partition part) 31a and a peripheral wall part 31b, and is attached to the rear frame 6 using the mounting bracket 6a. The first partition plate 31 has heat shielding properties and is formed, for example, by a steel plate treated with a heat resistant coating. The base part 31a of the first partition plate 31 has a plate shape that extends in the front-back direction from the front edge part of the engine room 9 to near the injection device 24, and is substantially rectangular. A rear edge part of the base part 31a is cut into a fan shape so that the right side surface of the injection device 24 is exposed when the vehicle body cover 40 is removed. Specifically, the base part 31a does not extend to the side of the injection device 24. The base part 31a is disposed between the selective catalyst reduction device 23 and the vehicle body cover 40. Further, radiant heat radiating toward the vehicle body cover 40 from the selective catalyst reduction device 23 can be blocked and consequently damage to the coating of the vehicle body cover 40 can be prevented.

The peripheral wall part 31b of the first partition plate 31 extends from the rear edge of the base part 31a toward the left side and covers the injection device 24 from the front thereof to above the injection device 24 so as to face the injection device 24. That is, the peripheral wall part 31b has a second partition part 31b1 that is a portion disposed between the injection device 24 and the selective catalyst reduction device 23, and a third partition part 31b2 that is a portion disposed between the injection device 24 and the top plate 43. The peripheral wall part 31b extends from the base part 31a to near the right side surface of the connecting pipe 22. The peripheral wall part 31b also extends substantially along the contour of the right side surface of the connecting pipe 22. As a result, the left side, the front, and the top of the injection device 24 are covered by the peripheral wall part 31b and the right side surface of the connecting pipe 22.

The second partition plate 32 has heat shielding properties and is formed, for example, by a steel plate treated with a heat resistant coating. The second partition plate 32 has a base part 32a and a peripheral wall part 32b, and is fixed to the inside surface of the upper cover 41 using bolts and the like. The second partition plate 32 is also removed when the upper cover 41 is opened to facilitate maintenance of the injection device 24 and the like.

The base part 32a of the second partition plate 32 is a plate that extends in the front-back direction from near the injection device 24 to the rear edge part of the engine room 9, and has a rectangular shape. The front edge of the base part 32a is located to the rear of the injection device 24. The base part 32a is disposed between the diesel particulate filtering device 13a and the vehicle body cover 40. As a result, radiant heat radiating toward the vehicle body cover 40 from the diesel particulate filtering device 13a can be blocked and consequently damage to the coating of the vehicle body cover 40 can be prevented.

The peripheral wall part 32b of the second partition plate 32 extends from the front edge of the base part 32a toward the left side and covers the injection device 24 from the rear thereof so as to face the injection device 24. Specifically, the peripheral wall part 32b is a fourth partition part that is disposed between the injection device 24 and the diesel particulate filtering device 13a. The peripheral wall part 32b extends from the base part 32a to near the right side surface of the connecting pipe 22. As described above, the injection device 24 is disposed inside an accommodating space S defined by the peripheral wall part 31b of the first partition plate 31, the peripheral wall part 32b of the second partition plate 32, the vehicle body cover 40, and the connecting pipe 22.

Figure 13:
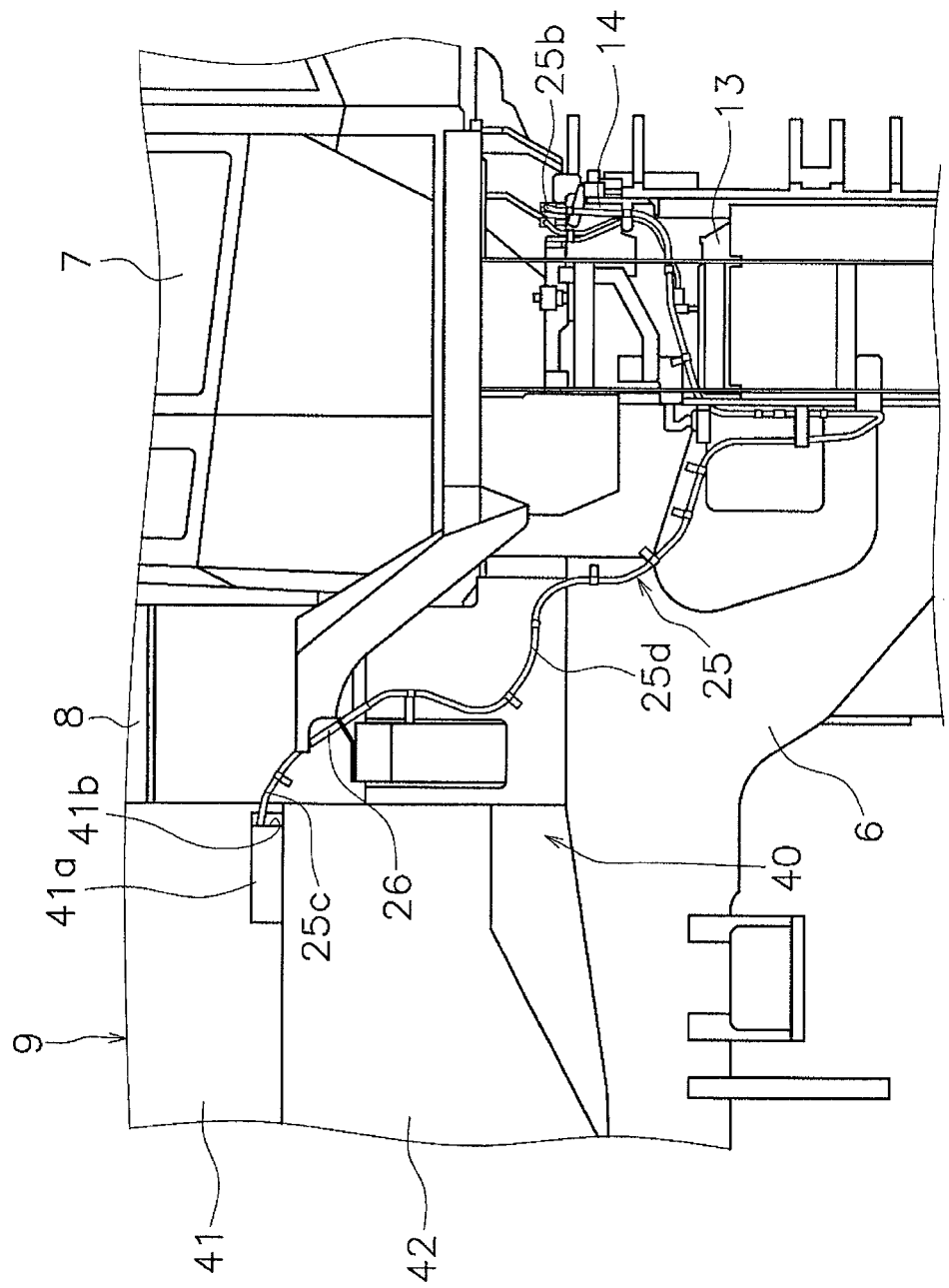
FIG. 13 is a right side view illustrating an example of disposition of a urea aqueous solution pipe.
Figure 14:
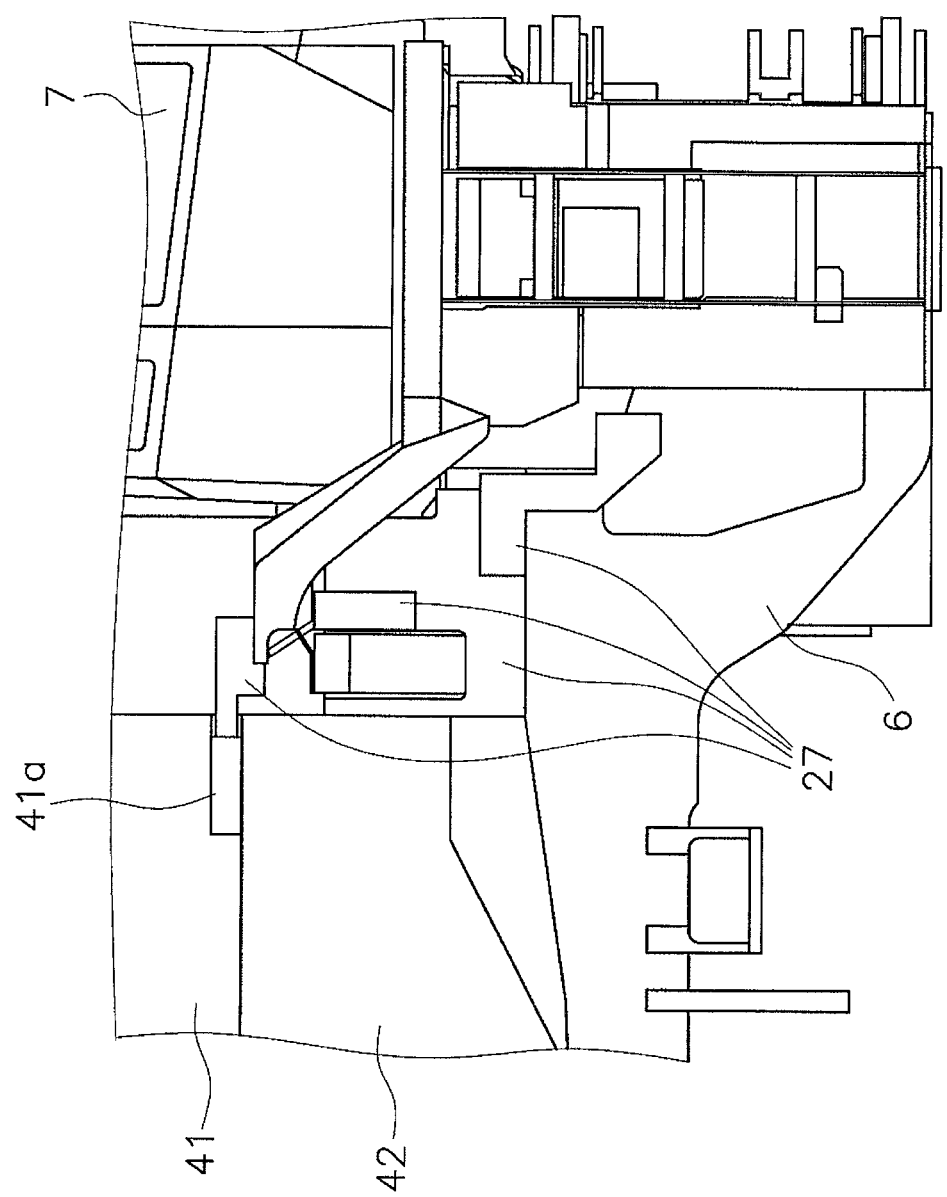
FIG. 14 is a right side view illustrating a state in which pipe covers are attached to the urea aqueous solution pipe.

FIG. 13 is a right side view illustrating an example of disposition of the urea aqueous solution pipe 25, and FIG. 14 is a right side view illustrating a state in which pipe covers are attached to the urea aqueous solution pipe 25. As illustrated in FIG. 13, the urea aqueous solution pipe 25 is connected to the injection device 24 at a first end part 25a (see FIGS. 11 and 12), and connected to the urea aqueous solution pump at a second end part 25b. The urea aqueous solution pipe 25 is a pipe for supplying the urea aqueous solution that is sucked up from the urea aqueous solution tank 13 by the urea aqueous solution pump 14, to the injection device 24.

The urea aqueous solution pipe 25 extends downward from the urea aqueous solution pump 14 to near the urea aqueous solution tank 13, extends in the horizontal direction above the urea aqueous solution tank 13, and drops downward once behind the urea aqueous solution tank 13. The urea aqueous solution pipe 25 extends upward along the outside surfaces of the rear frame 6 and the vehicle body cover 40, and is drawn in from the front edge of the upper cover 41 of the vehicle body cover 40 into the engine room 9. Specifically, the upper cover 41 has a bulging part 41a that bulges to the outside at the front edge part of the upper cover 41. The bulging part 41a extends in the front-back direction and has a pipe installation port 41b for drawing the urea aqueous solution pipe 25 into the engine room 9. The size of the pipe installation port 41b is designed so that the upper cover 41 does not interfere with the urea aqueous solution pipe 25 when the upper cover 41 is opened. As illustrated in FIG. 14, the urea aqueous solution pipe 25 is protected by a plurality of pipe covers 27 so that the urea aqueous solution pipe 25 is not exposed to the outside during normal operation.

As illustrated in FIGS. 11 and 12, the urea aqueous solution pipe 25 extends between the base part 31a of the first partition plate 31 and the vehicle body cover 40 inside the engine room 9. Consequently, radiant heat radiating from the selective catalyst reduction device 23 toward the urea aqueous solution pipe 25 can be blocked and consequently the urea aqueous solution flowing inside the urea aqueous solution pipe 25 can be prevented from being heated and changing into ammonia. Further, the peripheral wall part 31b of the first partition plate 31 is disposed between the first end part 25a of the urea aqueous solution pipe 25 and the selective catalyst reduction device 23. Thus, radiant heat radiating from the selective catalyst reduction device 23 toward the urea aqueous solution pipe 25 can also be blocked by the peripheral wall part 31b.

The urea aqueous solution pipe 25 is supported by a plurality of mounting brackets 6b (example of a supporting member) inside the engine room 9. The urea aqueous solution pipe 25 is supported by the mounting brackets 6b so as to maintain a certain distance from the first partition plate 31. The mounting brackets 6b extend upward from the rear frame 6 and are slanted in a direction away from the first partition plate 31. The mounting brackets 6b are disposed a certain distance away from each other in the front-back direction.

As illustrated in FIG. 13, a relay member 26 is disposed on the right side of the operating fluid tank 8. The relay member 26 is a member for interconnecting pipes. The urea aqueous solution pipe 25 connecting the injection device 24 and the urea aqueous solution pump 14 is configured as two pipes made up a first pipe 25c and a second pipe 25d. The first pipe 25c and the second pipe 25d are connected to each other to allow for fluid communication by the relay member 26. The first pipe 25c connects the relay member 26 and the injection device 24. The second pipe 25d connects the relay member 26 and the urea aqueous solution pump 14.

The first and second pipes 25c, 25d have heating wires so that the urea aqueous solution flowing therein does not freeze. The heating wire of the first pipe 25c and the heating wire of the second pipe 25d are controlled independently of each other. Specifically, only the heating wire of the first pipe 25c may be heated, or only the heating wire of the second pipe 25d may be heated, or both of the heating wires may be heated.

Characteristics

The wheel loader 1 according to the present embodiment has the following characteristics.

(1) The base part 31a of the first partition plate 31 is disposed between the vehicle body cover 40 and the selective catalyst reduction device 23, and the urea aqueous solution pipe 25 extends between the base part 31a and the vehicle body cover 40. Therefore, radiant heat from the selective catalyst reduction device 23 is blocked by the base part 31a so that heating of the urea aqueous solution pipe 25 can be prevented. As a result, the urea aqueous solution flowing inside the urea aqueous solution pipe 25 is prevented from changing to ammonia.

(2) The urea aqueous solution pipe 25 is prevented from coming into contact with the base part 31a due to the mounting brackets 6b supporting the urea aqueous solution pipe 25. The transfer of heat from the base part 31a toward the urea aqueous solution pipe 25 due to the base part 31a being heated by radiant heat from the selective catalyst reduction device 23 can be prevented by preventing contact between the urea aqueous solution pipe 25 and the base part 31a.

(3) The urea aqueous solution pipe 25 is introduced into the engine room 9 by the pipe installation port 41b of the bulging part 41a of the upper cover 41. Since the bulging part 41a bulges to the outside, the urea aqueous solution pipe 25 can be introduced into the engine room 9 without severe bending. If the urea aqueous solution pipe 25 extends along the bulging part 41a, the urea aqueous solution pipe 25 can be disposed in a location further away from the selective catalyst reduction device 23 since the bulging part 41a bulges to the outside.

(4) Since the peripheral wall part 31b of the first partition plate 31 is disposed between the injection device 24 and the selective catalyst reduction device 23, radiant heat radiating from the selective catalyst reduction device 23 toward the injection device 24 can be blocked by the peripheral wall part 31b.

(5) Since the urea aqueous solution pipe 25 is configured by two pipes being the first pipe 25c and the second pipe 25d, the length of pipe to be handled can be reduced and replacement work can be facilitated. Further, if the replacement periods of the first pipe 25c and the second pipe 25d are different, each of the pipes can be replaced at an appropriate period and the pipes are not replaced in a wasteful manner.

(6) Energy saving can be achieved since heating can be performed for only the first pipe 25c or the second pipe 25d that requires heating. Since the second pipe 25d that connects the relay member 26 and the reducing agent pump 14 is generally exposed to the atmosphere, the opportunity to heat the second pipe by the heating wire occurs more often than with the first pipe.

MODIFIED EXAMPLES

While an embodiment of the present invention has been described above, the present invention is not limited to the embodiment, and many variations and modifications may be made within the scope of the present invention.

Modified Example 1

While one partition plate (first partition plate 31) in the above embodiment includes the base part 31a disposed between the selective catalyst reduction device 23 and the vehicle body cover 40, and the peripheral wall part 31b disposed between the selective catalyst reduction device 23 and the injection device 24, the present invention is not limited as such. Specifically, a partition plate having the base part 31a and a partition plate having the peripheral wall part 31b may be different partition plates.

Modified Example 2

While the urea aqueous solution is used as the reducing agent in the above embodiment, the configuration is not limited as such in particular and another reducing agent may be used.

What is claimed is:
1. A wheel loader comprising:
an engine;
a selective catalyst reduction device configured to treat exhaust gas from the engine;
an injection device configured and arranged to inject reducing agent into the exhaust gas fed from the engine toward the selective catalyst reduction device:
an engine room accommodating the engine, the selective catalyst reduction device, and the injection device;
a vehicle body cover defining the engine room;
a partition plate having a first partition part that is disposed between the selective catalyst reduction device and the vehicle body cover;
a reducing agent tank disposed outside the engine room and configured to store reducing agent;

a reducing agent pump configured to supply the reducing agent from the reducing agent tank to the injection device; and a reducing agent pipe connecting the reducing agent pump and the injection device, and extending between the vehicle body cover and the partition plate inside the engine room.

2. The wheel loader according to claim 1, further comprising:

a supporting member supporting the reducing agent pipe so that the reducing agent pipe extends between the vehicle body cover and the partition plate in a state of being a certain distance away from the partition plate.

3. The wheel loader according to claim 1, wherein the vehicle body cover has a bulging part that includes a pipe installation port and bulges to the outside; and the reducing agent pipe is introduced into the engine room from the pipe installation port.

4. The wheel loader according to claim 1, wherein the partition plate further has a second partition part disposed between the injection device and the selective catalyst reduction device.

5. The wheel loader according to claim 1, further comprising a cab provided with a driver seat therein;

an operating fluid tank disposed between the cab and the engine room; and a relay member disposed beside the operating fluid tank, the reducing agent pipe having a first pipe that connects the relay member and the injection device, and a second pipe that connects the relay member and the reducing agent pump.

6. The wheel loader according to claim 5, wherein a first heating wire is provided in the first pipe and a second heating wire is provided in the second pipe, the first and second heating wires being controlled independently to heat the reducing agent flowing in the reducing agent pipe.

7. The wheel loader according to claim 1, wherein the reducing agent is a urea aqueous solution.

* * * * *